Patented Apr. 7, 1925.

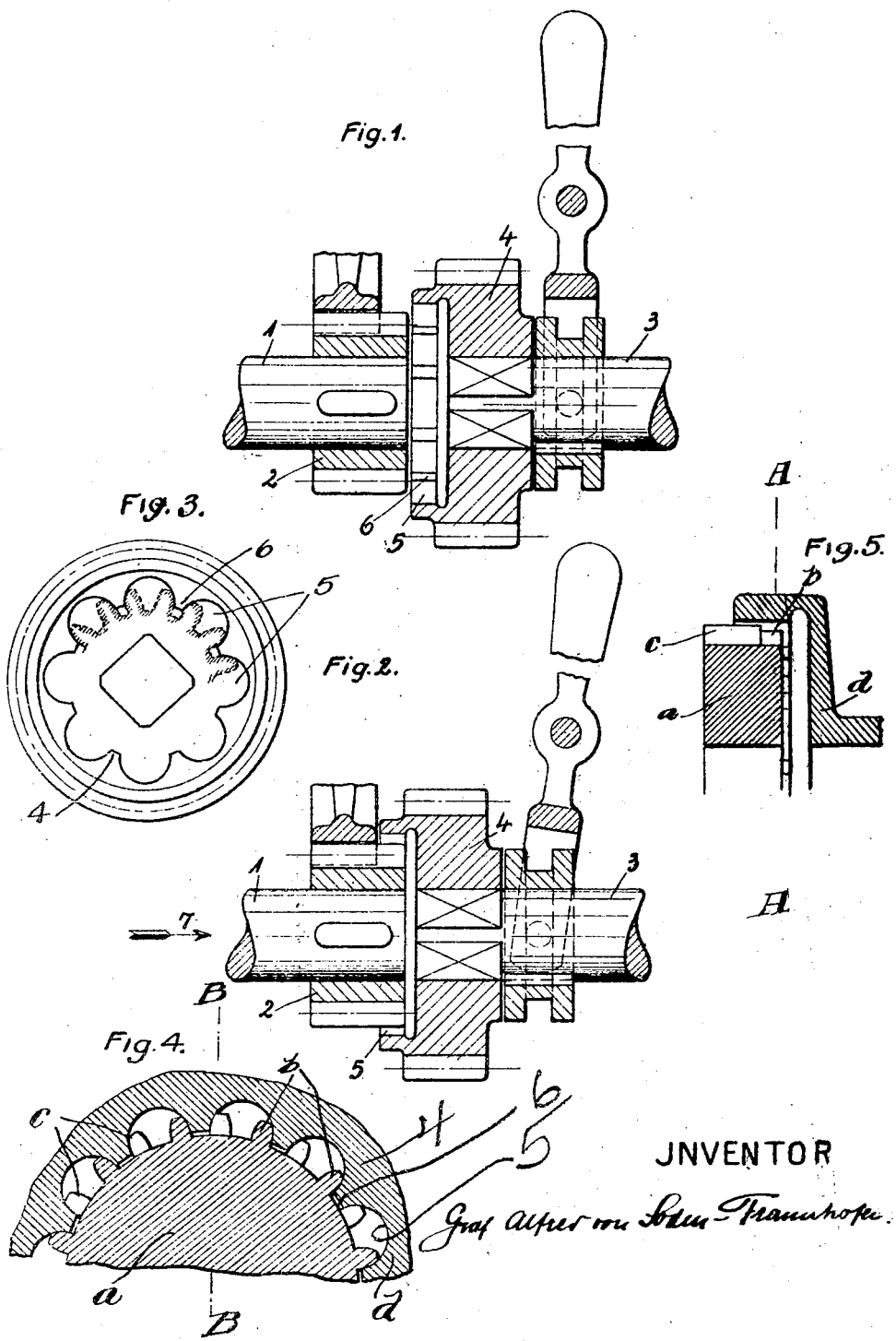

1,532,564

UNITED STATES PATENT OFFICE.

GRAF ALFRED VON SODEN-FRAUNHOFEN, OF FRIEDRICHSHAFEN, GERMANY, ASSIGNOR TO ZAHNRADFABRIK AKTIEN-GESELLSCHAFT, OF FRIEDRICHSHAFEN, GERMANY.

COUPLING.

Application filed August 13, 1921. Serial No. 492,145.

(GRANTED UNDER THE PROVISIONS OF THE ACT OF MARCH 3, 1921, 41 STAT. L., 1313.)

*To all whom it may concern:*

Be it known that I, GRAF ALFRED VON SODEN-FRAUNHOFEN, a citizen of Germany, residing at Friedrichshafen a. B., Germany, have invented certain new and useful Improvements in Couplings (for which I have filed application in Germany November 22, 1919, and February 28, 1920), of which the following is a specification.

My invention relates to couplings and more especially to a coupling for use with change speed gears.

In order to save space one has already made use of part of the width of spur-wheel teeth for the purposes of coupling. Up to the present however, in most cases an internal gearing more or less corresponding to the spur-gearing was made use of as a counter piece. An arrangement of this kind involves the essential disadvantages connected with all internal gear, particularly the difficulty of manufacture, if a tolerably good fit is to be obtained. Now and then indeed that advantage has been relinquished at the cost of durability or reliability and for each single tooth a counterpiece consisting of a circular or semicircular gap was designed. By this means, however, only a highly unsatisfactory fit, limited in most cases to single points, between spur wheel and counterpiece could be obtained.

I avoid these drawbacks by designing the counterpiece in such a manner that a plurality of the teeth of the spur wheel, forming part of the coupling, is made to gear into a common cylindrical bore of the counterpiece. In proceeding thus, the number of teeth enclosed by each bore and the curvature of the bore, being approximately semicylindrical, are to be chosen in such a way that the cylindrical curvature at least approximates the flang curve of the spur wheel gearing.

In this manner a light and above all a cheap coupling of a very compact design is obtained. By rounding off the single teeth of the spur wheel in a manner already well known and hollowing out the cylindrical bore as well as providing a suitable engaging and disengaging device the coupling may in addition be made capable of being easily thrown into and out of gear.

Now it is well known that such couplings, when under load, and especially when an accurate fit without any mutual play shall be attained, as is required for couplings of this kind, are only with difficulty thrown into gear. According to the present invention the action of easily engaging the coupling has been rendered possible by setting back in regular turn part of the teeth of the toothed wheel on its side facing the coupling rim. In this way gaps are formed in place of these teeth allowing the teeth of the coupling rim a certain play whilst under the effect of the load, which is never of an entirely uniform character, until by means of the still active engaging-pressure they are fully thrown into gear. At the same time the driving part, being under the influence of the torsional moment, will apply itself against the full tooth next succeeding in the direction of rotation, which forms a one-sided guide and thus induces a sliding and catching motion leading up to its being fully thrown into gear. By this means a reliable way of attaining this end is found without any trouble, at the same time greatly favouring the preservation of the material. For the action of entering into the first step proceeds at once in consequence of the large space existing between the teeth, which take an active part in it, whilst already a comparatively large area is provided for the transmission of power. Thus on the one hand any excessive work on the part of the outer ends of the teeth is avoided, whilst at the same time an easy engaging action is ensured in consequence of the small amount of friction.

In the drawings affixed to this specification two modifications of a coupling embodying my invention are illustrated by way of example. In the drawings Fig. 1 is an axial section, showing the coupling in a disengaged state;

Fig. 2 is a similar view of the coupling thrown into gear, while

Fig. 3 is a side elevation of one half of the coupling;

Figs. 4 and 5 are sections, taken at right angles, of another modification.

Referring to the drawings, shaft 1 carries a spur wheel 2 keyed on to it, the teeth of which are partly to be used as a means for coupling it to a second shaft 3. For this purpose the internally toothed clutch member 4, fixed upon shaft 3 by a square, is provided with a number of semicylindrical bores 5 in such a manner that each two of them form a tooth-like projection 6.

In Fig. 1 the two shafts 1 and 3 are shown separated, in Fig. 2 in their coupled state. The manner of engaging them is represented in Fig. 3. This figure shows the internally toothed clutch member 4 as viewed in the direction of arrow 7, and in dotted lines a partial view of the gearing of spur wheel 2 engaged to it.

The curvature of the flank of two teeth embraced by the cylinder agrees well with the cylindrical curve. In accordance with the width of the pitch, a greater number of teeth may be enclosed with advantage or the semi-cylinder may be reduced in size by somewhat more than one half or increased by more than one half. For the purpose of more easily engaging and disengaging them the teeth of wheel 2 have been rounded off and the teeth 5 somewhat hollowed out. In the modification disclosed in Figs. 4 and 5 the throwing into gear of the coupling is facilitated by setting back every second tooth of the spur wheel.

The counter piece $d$, being provided with an internal gear, which corresponds to the construction shown in Figs. 1 to 3, has been designed in such a manner that every second tooth being omitted, the gaps consist of cylindrical bores. The throwing into gear is accomplished by at first only making the teeth $b$ of wheel $a$ catch the inner gear of clutch member $d$. Though already thrown into gear, the coupling is still allowed a play corresponding to the size of the gaps between two teeth $b$.

In accordance with the direction of the rotation, the teeth $b$ will apply themselves against one or the other flank of the teeth of the internal gear.

Whilst the coupling is being further pushed together, the teeth $b$ are sliding along the teeth of the internal gear, thus allowing the catching action of the teeth $c$ to accomplish without any trouble the final rigid coupling.

I claim:

1. In a coupling in combination, a spur wheel, an internally toothed clutch member, forming the coupling members, means for moving said clutch member in and out of intermeshing relation with said spur wheel, the teeth on said member being so proportioned, that the gaps between the teeth of said internally toothed clutch member embrace each more than one tooth of said spur wheel.

2. In a coupling in combination, a spur wheel, and an internally toothed clutch member, forming the coupling members and means for moving said internally toothed clutch member in and out of intermeshing relation with said spur wheel, the teeth on said members being so proportioned, that a gap in said internally toothed clutch member embraces more than one tooth of said spur wheel.

3. In a coupling in combination, a spur wheel, and an internally toothed clutch member and provided with substantially semicylindrical gaps forming the coupling members and means for moving said internally toothed clutch member in and out of intermeshing relation with said spur wheel, the teeth on said members being so proportioned, that a gap in said internally toothed clutch member embraces more than one tooth of said spur wheel.

4. In a coupling in combination, a spur wheel, and an internally toothed clutch member provided with substantially semicylindrical gaps forming the coupling members and means for moving said internally toothed clutch member in and out of intermeshing relation with said spur wheel, the teeth on said members being so proportioned, that a gap in said internally toothed clutch member embraces more than one tooth of said spur wheel and its curvature approximately corresponds to the curvature of the flanks of said teeth.

5. In a coupling in combination, a spur wheel, alternate teeth on said wheel being recessed and an internally toothed clutch member, said spur wheel and internally toothed clutch member forming the coupling members and means for moving said internally toothed clutch member in and out of intermeshing relation with said spur wheel, the teeth in said members being so proportioned, that the gaps between the teeth of said internally toothed clutch member embrace each more than one tooth of said spur wheel.

In testimony whereof I affix my signature.

GRAF ALFRED VON SODEN-FRAUNHOFEN.